May 3, 1949.　　　J. ZSINOR ET AL　　　2,468,910
SCOOTER CONSTRUCTION
Filed April 12, 1946
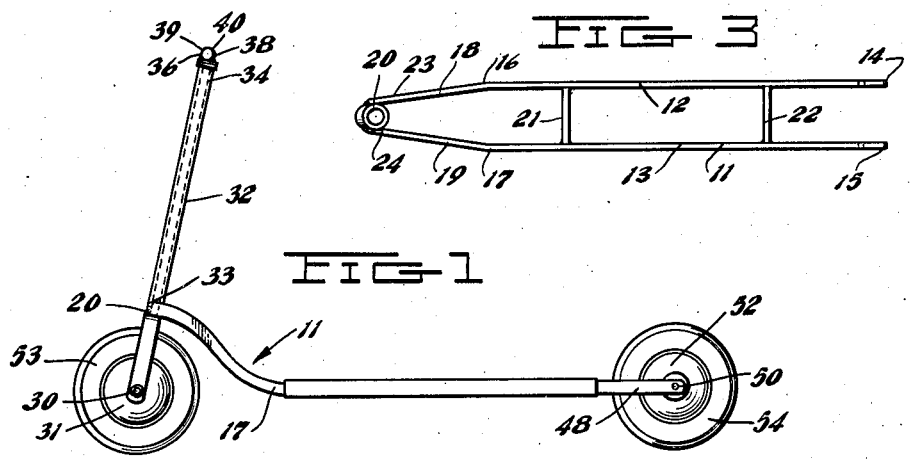
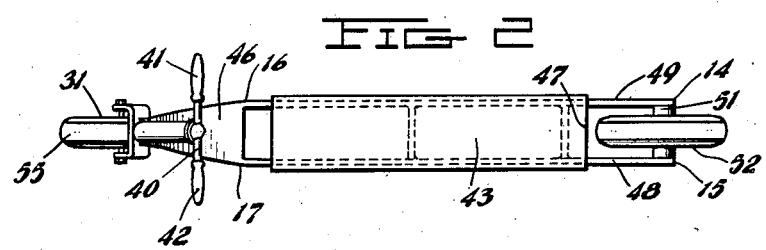
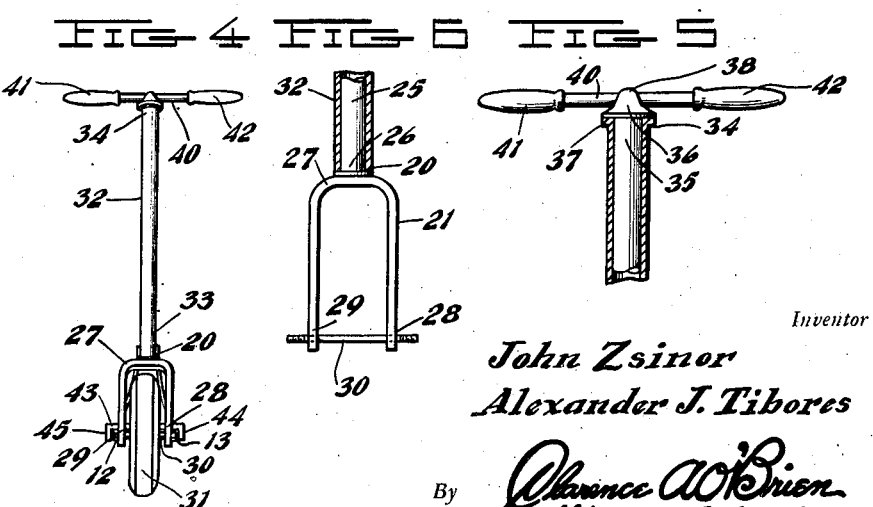
Inventor
*John Zsinor*
*Alexander J. Tibores*
By *Clarence A. O'Brien*
*and Harvey B. Jacobson*
Attorneys Patented May 3, 1949

2,468,910

UNITED STATES PATENT OFFICE 2,468,910

SCOOTER CONSTRUCTION

John Zsinor and Alexander J. Tibores, Detroit, Mich.; said Zsinor assignor to said Tibores Application April 12, 1946, Serial No. 661,755

1 Claim. (Cl. 280—87.04)

The invention which is herein disclosed is that of a scooter and has for its object to provide a means whereby a vehicle of this type may be made practically indestructible.

Another object of the invention is to provide a scooter formed entirely of metal with the exception of the tires which may also be formed of thin airtight tubular metal if desired.

Another object of the invention is to provide a scooter body the frame being formed of bar iron and the foot board of sheet metal.

A further object of this invention is to provide means whereby a scooter may be so rigidly and strongly constructed that it will be next to impossible for a child to destroy or break the same throughout the years it is young enough to enjoy using such a toy.

Other features and advantages will become more readily apparent from the following description and the accompanying illustrative drawings in which:

Figure 1 is a side elevational view of the scooter,

Figure 2 is a top plan view thereof,

Figure 3 is a detailed plan view of the frame of this device,

Figure 4 is a front elevational view of Figure 1,

Figure 5 is a partial sectional view of the upper portion of the head tube with handle bar assembly supported thereon, and Figure 6 is a partial sectional view of the metal head tube showing the fork supported therein.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout and in which the framework of the scooter is formed of a pair of steel or malleable iron bars 12 and 13 which are parallel from parts 14 and 15, at the rear ends thereof, to parts 16 and 17, from which latter parts they converge together to a common bearing and are also upwardly inclined to a plane above the said frame, as at 18 and 19, the bearing being designated 20. The said parallel portion of bars 12 and 13 are connected by cross brace bars 21 and 22. The bars 12, 13, 21 and 22 are welded together at their points of connection and the forward terminals 23 and 24 of the side bars are welded to the bearing 20.

Projecting through the said bearing 20 is an upright spindle 25, to the lower end 26 of which is integrally connected a fork 21 upon the head 27 of which the bearing 20 seats. (A ball bearing may be interposed at this connection if desired.) The lower terminals 28 and 29 of the fork 21 are bored to receive the axle 30 upon which the front wheel 31 is mounted. A metal tube 32 through which the spindle 25 operates, has its lower end 33 seated above the bearing 20. The upper end 35 of the spindle 25 will extend through the upper end 34 of the metal tube 32. This terminal 35 is enlarged into a disk 36 which seats upon the annular flange 37 of said tube end 34. The disk 36 is provided with a conical extension 38 with a bore 39 through which a handle bar 40 extends and is welded therein. Integral handles 41 and 42 are formed on the opposing ends of the handle bar 40.

A foot or running board 43 is mounted upon the frame 11, the downwardly turned flanges 44 and 45 of which are welded to the bars 12 and 13, and a taper plate 46 with similar flanges is welded to the inclining ends 18 and 19 of the bars 12 and 13.

The bars 12 and 13 extend beyond the rear end 47 of board 43 to provide bearing members 48 and 49 for a shaft 50, upon which the hub 51 of a rear wheel 52 is mounted. The tires 53 and 54 of the wheels 31 and 52 may be formed of sufficiently thin tubular metal, power inflated before sealing to such an extent as to resist indentation and to provide extremely narrow treads 55 may be used. Such a tire will provide resilience and be frictionally as noiseless as rubber or composition, however, tires of the latter nature may be used on the wheels where preferred.

From the foregoing specification it will become apparent that the invention disclosed will adequately accomplish the functions for which it has been designed and in an economical manner and that its simplicity, accuracy and ease of operation are such as to provide a relatively inexpensive device considering what it will accomplish and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described the invention that which is claimed to be new and desired to be procured by Letters Patent is:

A scooter comprising a frame having a pair of spaced side bars and a plurality of cross bars between said side bars, said side bars having opposed apertures adjacent their rear terminals, a rear axle supported in the apertures in said bars, a rear wheel rotatably mounted on said rear axle, said bars having upwardly and forwardly inclined extensions at their forward terminals, a bearing fixed to the forward extremities of said extensions, a spindle projecting through said bearing, a fork fixed to the lower end of said spindle having a head portion forming a seat for the bearing, a tubular head embracing said spindle, the lower end of said head being seated upon said bearing, an annular bearing flange integrally formed with the upper end of said head, a disk integrally formed with the upper end of said spindle and bearing upon said flange, a conical extension integrally formed with said disk and having a transverse bore, a handle bar engaging the bore and fixed thereto, a front axle and wheel carried by said fork, and a platform carried by said frame, said platform including depending side flanges fixed to said side bars.

JOHN ZSINOR.
ALEXANDER J. TIBORES.

REFERENCES CITED

The following references are of record in the file of this patent:

UNITED STATES PATENTS

| Number | Name | Date |
| --- | --- | --- |
| D. 45,868 | Gibson | June 2, 1914 |
| 1,352,213 | O'Meara | Sept. 7, 1920 |
| 1,674,272 | Zander | June 19, 1928 |
| 1,689,916 | Fisher | Oct. 30, 1928 |
| 1,951,277 | Elliotte | Mar. 13, 1934 |

FOREIGN PATENTS

| Number | Country | Date |
| --- | --- | --- |
| 101,290 | Australia | June 9, 1937 |